United States Patent [19]
Webb

[11] Patent Number: 5,196,984
[45] Date of Patent: Mar. 23, 1993

[54] SUBMARINE TELECOMMUNICATIONS SYSTEMS

[75] Inventor: Stephen M. Webb, London, England

[73] Assignee: Northern Telecom Limited, Montreal, Canada

[21] Appl. No.: 806,724

[22] Filed: Dec. 12, 1991

[30] Foreign Application Priority Data

Feb. 8, 1991 [GB] United Kingdom ............... 9102714

[51] Int. Cl.$^5$ .................. H01H 47/22; H04B 3/00
[52] U.S. Cl. .................................. 361/191; 361/170;
307/38; 307/130; 333/105
[58] Field of Search ............ 333/100, 101, 105;
307/38, 125, 130, 131, 100, 112, 39, 41;
361/191, 170, 167, 166; 379/348, 296

[56] References Cited

U.S. PATENT DOCUMENTS

| 3,462,653 | 8/1969 | Koeman et al. | 361/191 |
| 3,644,787 | 2/1972 | Hamilton | 307/100 X |
| 3,889,131 | 6/1975 | Speller | 307/136 |
| 4,138,627 | 2/1979 | Camic | 307/39 X |
| 4,247,787 | 1/1981 | Page | 307/112 |
| 4,521,822 | 6/1985 | Simard | 361/35 |
| 4,798,969 | 1/1989 | Inoue et al. | 307/112 |

FOREIGN PATENT DOCUMENTS 1-202035A 8/1989 Japan ................................ 379/348
2202110 9/1988 United Kingdom .

OTHER PUBLICATIONS

Kogure, Yoshichi; Patent Abstracts of Japan; ABS Group E842; vol. 13, No. 493; 01-198123; Feeding Current Switching Circuit.

Primary Examiner—A. D. Pellinen
Assistant Examiner—Fritz M. Fleming
Attorney, Agent, or Firm—Lee, Mann, Smith, McWilliams, Sweeney & Ohlson

[57] ABSTRACT

A branching unit for use in a submarine telecommunications cable system which employs electrical power feeding for repeaters/regenerators and in particular a system employing multiple branching units. The unit terminates three line cables (at 1, 2, 3) and a sea earth (at 4) and includes three high voltage element relays (A, A1; B, B1; C, C1) only one of which is energized at a time. When electrical power is supplied between any two line cables the third is isolated and connected to the sea earth. Short circuit or open circuit faults in one line cable may be isolated and connected to the sea earth, whilst allowing powering of the remaining fault free two line cables. The unit is polarity insensitive and symmetrical, cathodic protection being provided on all three lines (FIG. 1).

4 Claims, 1 Drawing Sheet

SUBMARINE TELECOMMUNICATIONS SYSTEMS

BACKGROUND OF THE INVENTION

This invention relates to submarine telecommunications systems employing electrical power feeding and in particular to branching units for optical fibre submarine cable systems.

Submarine cable systems originally were such as to connect two land terminals which were, for example, on the opposite sides of the Atlantic ocean. A later development involved having two land terminals on one side and a third on the other side, there being a main cable extending between the third land terminal and a branching unit (y interconnect) and spur cables extending from the branching unit to the other two terminals. Repeaters may be disposed in the main cable and the spur cables and power feed provision must thus be made. The repeaters can be powered by supplying current between a land terminal (terminal station) at one end of a branch (main or spur) cable and a distant earth (single end feeding) or between any two terminal stations (double end feeding). Branching units have previously been proposed whereby power feed of the repeaters in the main cable and one spur cable is by double end feeding, whereas that of the repeaters in the other spur cable is by single end feeding, the earth being provided by a sea earth cable extending from the branching unit. The branching unit may include relays by means of which the power feeding can be changed (switched) in the event of fault conditions in one of the branches, in order to isolate that branch whilst continuing to power the other branches. Such power feed switching can alternatively be achieved by use of remote signalling rather than relays.

Optical fibre submarine cable systems are now being proposed having a number of branching units, that is involving multiple landing points. The hitherto proposed branching units are unsuitable for use in such multiple branching unit systems since under certain switching conditions cathodic protection of the sea earth ground plate can be lost, in which case the ground plate will be eroded and may eventually disintegrate.

It is therefore, an object of the present invention to provide an alternative design of branching unit which can be used in multiple branching unit systems without giving rise to loss of cathodic protection.

SUMMARY OF THE INVENTION

According to the present invention there is provided a branching unit, for use in submarine telecommunications cable systems employing electrical power feeding, the unit having a respective termination for each of three line cables and a termination for a sea earth, which unit includes three electrical relays, only one of which is energised at a time, and is such that when electrical power is supplied between any two of the line cable terminations the third line cable termination is isolated therefrom and coupled to the sea earth termination.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
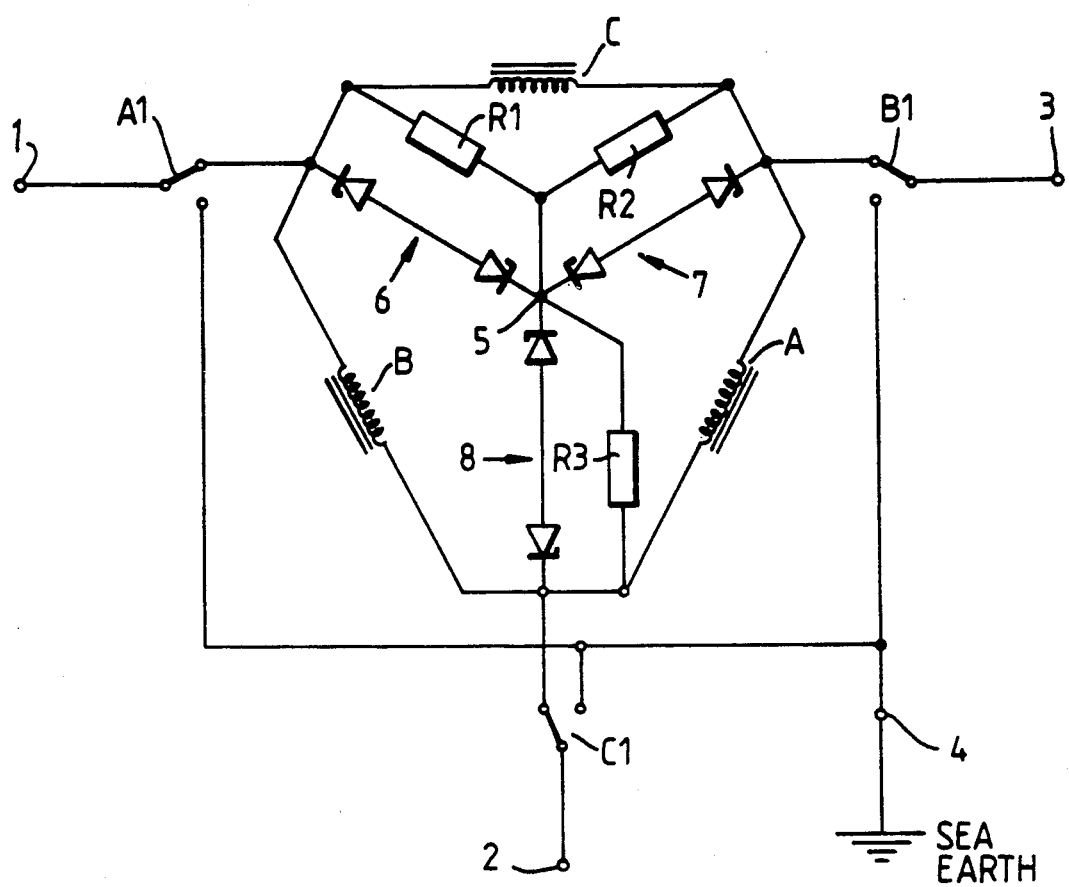
FIG. 1 is a functional schematic of the inventive branching unit.

The branching units of the present invention, as for example shown schematically in FIG. 1, are passive, that is they do not involve regenerators etc. for the optical signals. They are designed to terminate three cables and also provide the sea earth for power feeding. The unit has three terminals 1, 2 and 3 to which the power conductors of the respective branch cables (spur cables) are connected (terminated) in use, as well as a terminal 4 for connection to the sea earth. As will be appreciated from FIG. 1 the unit is symmetrical. It is basically comprises three high voltage relays having relay coils A, B, C respectively, which relay coils are arranged in a delta network, and sets of relay contacts A1, B1 and C1 each having two connecting states. Each relay coil is disposed between a pair of the line terminations and the set of the relay contacts corresponding to each coil are associated with other one of the line terminations in that the other line termination is connected to the delta network in one connecting state (as illustrated) of the set of relay contacts or connected to the sea earth termination in the other (not illustrated) connecting state of the set of relay contacts e.g. coil C is between terminations 1 and 3 while the set of contacts C1 are associated with termination 2 and can connect it to the delta network or to sea earth termination 4. With the relay contacts in the switch positions illustrated (the quiescent state) the arrangement is unpowered and the terminals 1, 2 and 3 are all connected to a junction point 5 and isolated from the sea earth. Series arrangements 6, 7 and 8 of zener diodes are disposed between the junction point and the relay contacts A1, B1 and C1 as shown. The zener diodes are arranged in back-to-back pairs. In parallel with each series arrangement 6, 7 and 8 of zener diodes is a respective ballast resistor R1, R2, R3. The overall arrangement provides for line current switching between the lines (cables) terminated thereat. Once power has been applied to any two terminals, or rather the branches connected thereto, the remaining branch is isolated and switched to the sea earth. This remaining branch can be powered independently i.e. fed to the sea earth.

Figure 2A:
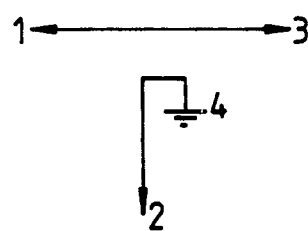
FIGS. 2a, b and c indicate the three possible powering modes of the branching unit of FIG. 1.
Figure 2B:
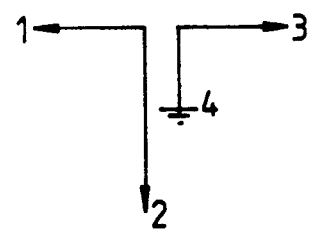
Figure 2C:
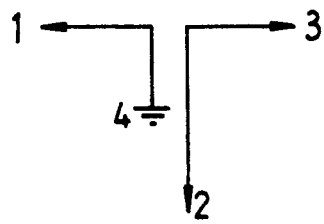

The three high voltage relays are used to switch the power paths. The two branch lines between which power is first applied cause the other branch line to be automatically switched to the sea earth. Only one of the relays is energised at any time. If power is first applied between terminals 1 and 3, the relay having coil C and contacts C1 is energised and thus terminal 2 is connected to terminal 4 and to the sea earth (FIG. 2a). If power is first applied between terminals 1 and 2, the relay having coil B and contacts B1 is energised and thus terminal 3 is connected to the sea earth (FIG. 2b). If power is first applied between terminals 2 and 3, the relay having coil A and contacts A1 is energised and thus terminal 1 is connected to the sea earth (FIG. 2c).

The method of power feed switching of the branching unit preferably involves applying a low current of the order of say 100-300 mA between the two branches over which power is intended to be applied, whilst open circuiting, at its remote end, the branch which is to be switched to the sea earth. Current then flows through the relay coil between the two powered branches, causing the relay contacts on the third branch to switch that branch to the sea earth. The voltage drop across the relay coil is held by virtue of voltage regulation using the respective pairs of zener diode arrangements, e.g. arrangements 6 and 7 for relay coil C. Once a relay has been switched, the current in each branch can be increased to the full line current, the majority of which flows through the respective pairs of zener diodes, e.g. 6 and 7 for relay coil C.

If the power feed mode is initially set as in FIG. 2a, for instance, and the branch cable coupled to terminal 3 subsequently develops an open circuit fault, current will no longer flow in relay coil C and contacts C1 will revert to the position shown in FIG. 1 so that terminal 2 is disconnected from the sea earth. Current can then flow between terminals 1 and 2 which will cause relay contacts B1 to change over and connect terminal 3 to terminal 4 and the sea earth, thus isolating the branch cable with the fault whilst allowing power feeding of the other branch cables. If the branch cable coupled to terminal 3 develops a short circuit fault the cable system may be depowered and then repowered with the contacts B1 switched to connect terminal 3 to the sea earth, thus also isolating the branch cable with the fault.

When used in a system employing a number of similar branching units, the design of branching unit proposed by the present invention has the advantage over previous designs that open or short circuit faults in any branch may be isolated and powering of the fault free branches achieved without the loss of the cathodic protection of the sea earth. Since the branching unit is symmetrical this protection is provided on all three lines terminated by the branching unit.

The relay operation is independent of current direction through the actuating coil and only depends on the current magnitude. The zener diode arrangement serves to limit the voltage applied to the relay coils independently of current direction. Thus it will be appreciated that the branching unit design is not polarity sensitive and, therefore, when used in conjunction with repeaters suitable for reversible powering, great flexibility in the power feed arrangement is achieved.

I claim:

1. A branching unit, for use in submarine telecommunications systems employing electrical power feeding, the unit having first, second and third line terminations, one for each of three line cables, and a termination for a sea earth, which unit includes first, second and third electrical relays, only one of which is energised at a time in use of the branching unit, which relays each have a respective relay coil and a respective set of relay contacts with first and second connecting states, wherein each one of the first, second and third line terminations is electrically connected to the set of relay contacts of a respective one of said first, second and third relays and the relay coil corresponding to said set of relay contacts is electrically connected between the sets of relay contacts of the other two of the first, second and third line terminations, the relay coils being electrically connected in a delta network, wherein the sea earth termination is electrically connected to each of the sets of relay contacts and in the first connecting state of each set of the relay contacts the sea earth terminal is electrically connected to the respective line termination, wherein in an unpowered, quiescent state of the branching unit the sets of relay contacts are all in the second connecting state and the first, second and third line terminations are electrically connected to the delta network and electrically disconnected from the sea earth termination, and wherein when electrical power is supplied between any pair of the first, second and third line terminations the relay corresponding to the other of the first, second and third line terminations is energised and the relay contacts set thereof switched to the first connecting state whereby to electrically isolate said other line termination from the said pair of terminations and to electrically connect it to the sea earth termination.

2. A branching unit as claimed in claim 1 and including respective zener diode arrangements disposed in parallel with each relay coil and serving to hold by voltage regulation the respective set of relay contacts in the first connecting state when electrical power is supplied between said pair of said line terminations, whereby to maintain the isolation of the other line termination from said pair of terminations and its connection to the sea earth termination, the zener diode arrangements being such that the branching unit is polarity insensitive.

3. A branching unit as claimed in claim 2 comprising first, second and third pairs of zener diodes coupled back-to-back, each zener diode arrangement disposed in parallel with a said relay coil comprising two said pairs of zener diodes arranged in series.

4. A branching unit as claimed in claim 3 and including a respective ballast resistor in parallel with each of the pairs of zener diodes.

* * * * *